(12) United States Patent
Hameed et al.

(10) Patent No.: US 8,788,724 B2
(45) Date of Patent: Jul. 22, 2014

(54) STORAGE DEVICE TO PROVIDE ACCESS TO STORAGE RESOURCES OVER A DATA STORAGE FABRIC

(71) Applicant: Hewlett-Packard Development Company, L.P., Houston, TX (US)

(72) Inventors: Sohail Hameed, Houston, TX (US); Balaji Natrajan, Spring, TX (US); Michael G Myrah, Sammamish, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/690,354

(22) Filed: Nov. 30, 2012

(65) Prior Publication Data

US 2014/0156878 A1    Jun. 5, 2014

(51) Int. Cl.
*G06F 3/00* (2006.01)
*G06F 1/26* (2006.01)

(52) U.S. Cl.
USPC .......................................... 710/19; 713/320

(58) Field of Classification Search
CPC ............ G06F 11/0787; G06F 11/1402; Y02B 60/1246; H04L 43/00; H04L 43/16; H04L 49/90; G11B 27/105; G11B 27/10; H04N 1/0005; H04N 1/0009
See application file for complete search history.

(56) References Cited

U.S. PATENT DOCUMENTS

| | | | |
|---|---|---|---|
| 7,996,509 B2 | 8/2011 | Basham et al. | |
| 8,074,105 B2 | 12/2011 | Kalwitz et al. | |
| 2009/0319652 A1 | 12/2009 | Odenwald, Jr. et al. | |
| 2012/0166829 A1* | 6/2012 | Jinno et al. | 713/320 |
| 2013/0080829 A1* | 3/2013 | Colline | 714/6.22 |
| 2013/0191573 A1* | 7/2013 | Raghavan et al. | 710/300 |
| 2013/0219393 A1* | 8/2013 | Myrah et al. | 718/1 |

* cited by examiner

*Primary Examiner* — Hyun Nam
(74) *Attorney, Agent, or Firm* — Arthur Ortega

(57) ABSTRACT

Provide access to storage resources of a storage device over a data storage fabric. Allow a zone manager of a first switch to assign a zone group to one of a plurality of phys of an expander of the storage device to allow the first switch to access storage resources of the storage device. If status of the phy that is assigned a zone group indicates a disconnection condition with the first switch, then configure the zone group of the expander of the storage device to prevent access to the storage resources of the storage device. If after the disconnection condition, the status of the phy indicates a reconnection condition with a second switch, then allow a zone manager of the second switch to assign a zone group to the phy to allow the second switch to access storage resources of the storage device.

20 Claims, 3 Drawing Sheets

STORAGE DEVICE TO PROVIDE ACCESS TO STORAGE RESOURCES OVER A DATA STORAGE FABRIC

BACKGROUND

Serial attached small computer system interface (SAS) is a communication protocol for enabling communication between computer devices. In the SAS protocol, SAS devices include initiator devices, target devices, and expander devices. Initiator devices are devices that can begin a SAS data transfer, while target devices are devices to which initiator devices can transfer data. Expander devices are devices that can facilitate data transfer between multiple initiator devices and multiple target devices. The SAS protocol utilizes a point-to-point bus topology. Therefore, if an initiator device is required to connect to multiple target devices, a direct connection can be established between the initiator device and each individual target device to facilitate each individual data transfer between the initiator device and each individual target device. A SAS switch is a SAS device that can include expander devices which can manage the connections and data transfers between multiple initiator devices and multiple target devices. A SAS fabric is data storage fabric that can include a network of initiator devices, target devices and expander devices.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
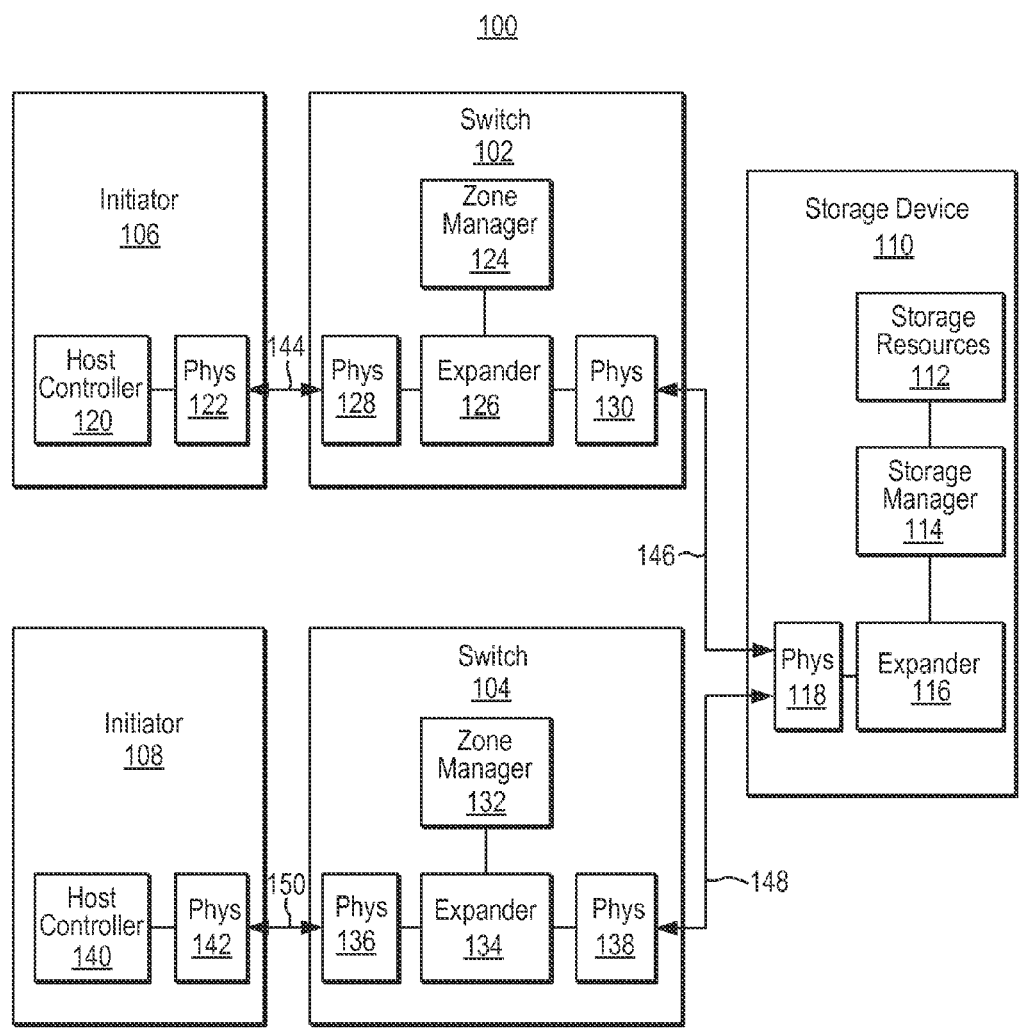
FIG. 1 is an example block diagram of a storage device to provide access to storage resources over a fabric.

As explained above, SAS is a communication protocol for enabling communication between SAS enabled devices over a SAS fabric. A SAS fabric can include a plurality of initiators coupled to targets such as storage devices which can support and manage access to storage resources such as disk drives that can respond to commands from initiators to store date and retrieve data from such resources. In one example, initiators may be hosts that include host controllers which can exchange data with corresponding targets such as storage devices. The storage devices may be configured as SAS enabled storage enclosures which can support storage resources over a SAS data storage fabric or other data storage fabric. The initiators may be configured through the use of zone groups to provide authorization to access devices or resources such as storage resources. The zone groups can provide the devices with the ability to manage and control access to storage resources and facilitate commands to store or write data to storage resources and commands to read or retrieve data from storage resources. The initiators may be assigned zone groups (zoned) to provide access to storage resources of a storage device which may be supported by a SAS enclosure. The data storage fabric may include a switch with expanders configured to provide communication and facilitate data transfers between the initiators and storage devices or other target devices. The communication means may include communication links established with communication medium such as a cable coupled or connected between the switch and the storage device and other devices.

A host or initiator during normal operation can access (such as initiate and exchange) data with its corresponding zoned storage resources. For example, the initiator can send commands to the storage device to write data to the zoned storage and later send commands to retrieve the data from storage. A switch using expanders may be connected between the initiator and storage and can route the commands to a storage device that supports the zoned storage resources. However, the storage device may encounter a disconnection condition which may include a communication link having a cable that becomes disconnected or uncoupled between the switch and the storage device that may disrupt or prevent communication between the switch and the storage device. In response to this disconnection condition, the system may later encounter a reconnection condition that may include a reconnecting or coupling the cable to second switch in order to reestablish a communication link between this second switch and the storage device. However, the communication link established from the reconnection may provide initiators attached to the second switch with unauthorized access to the storage resources of the storage device. This may present a security problem and may not be desirable. As explained below in further detail, the present application provides techniques that may help reduce unauthorized access to storage resources of a storage device in the event of a disconnection condition and later reconnection condition.

This present application describes techniques for a storage device to provide access to storage resources over a data storage fabric. For example, the storage device can include a storage manager to manage the operation of storage device and control access to storage resources. The storage device can include an expander having phys which can be assigned zone groups to control (allow or prevent) access to storage resources of the storage device over a data storage fabric. In one example, the phys can be part of input/output module and associated with expanders which can include transmitters and receivers for communicating with phys of expanders of other devices such as expanders associated with switches. The storage manager can be configured to communicate with a zone manager of a first switch and allow zone manager to assign a zone group to one of the phys of the expander of the storage device to allow the first switch to access storage resources of the storage device.

The storage manager can be configured to check the status of the phy that is assigned a zone group. If the status indicates a disconnection condition with the first switch, then the storage manager can configure the zone group of the expander of the storage device to prevent access to the storage resources of the storage device. In this manner, the storage manager may help reduce the occurrence of unauthorized access to storage resources when a disconnection condition occurs and thereby increase the security of the data storage fabric. The storage manager can then check the status of the phy after the disconnection condition. If the storage manager determines that the status of the phy indicates a reconnection condition with a second switch, then the storage manager can allow a zone manager of the second switch to assign a zone group to the phy to allow the second switch to access storage resources of the storage device. In this manner, the storage manager may help prevent the second switch from automatically gaining access to the storage resources of the storage device. Instead, the second switch needs to provide the storage manager with zone group information which the storage manager uses to configure the storage device to provide access to the corresponding zoned storage resources.

FIG. 1 is an example block diagram of a system that includes a storage device to provide access to storage resources over a data storage fabric 100. The data storage fabric 100 includes a storage device 110 coupled to a plurality of switches 102, 104 which are in turn coupled to respective initiators 106, 108. In one example, data storage fabric 100 can be a SAS network or system and storage device 110 and switches 102, 104 and respective initiators 106, 108 can be configured as SAS enable devices capable of communicating using the SAS protocol. In one example, data storage fabric 100 can be configured as a SAS-2 fabric employing devices in accordance with SAS-2 protocols. However, it should be understood that the configuration of the topology of data storage fabric 100 is shown for illustrative purposes and the techniques of the present application can be employed with other network configurations and technologies, such as, for example, network attached storage (NAS) and the like.

The initiator 106 is configured to manage communication and initiate data transfers with other devices over data storage fabric 100. For example, initiator 106 includes a host controller 120 and phys 122. The phys 122 may associated with ports of input/output modules or expanders of initiator 106 and can include transmitters and receivers for communicating with other phys of ports of devices over data storage fabric 100. For example, phys 122 of initiator 106 can be configured through the use of zone groups to communicate with phys 128 of switch 102 over communication link 144. The initiator 106 can include a SAS enabled data processing device capable of communicating with other SAS devices over data storage fabric 100. For example, initiator 106 can be a server computer, personal computer, tablet device, smartphone, and connected to other similar devices and the like. The host controller 120 can be configured to provide processing functionality to support initiator 106 including functionality to initiate data transfers with other devices. For example, initiator 106 can include a storage controller such as an array controller for managing storage arrays. The host controller 120 can comprise storage controllers such as disk array controllers which can manage physical disk drives and present them to the servers as logical units. In some examples, array controllers can implement RAID functionality and may be referred to as RAID controllers.

The initiator 106 can be a SAS enabled initiator device capable of generating multiple commands that can be sent or transmitted through switch 102 and received by storage device 110 and directed to access storage resources 112. The initiator 106 can be assigned a zone group (zoned) which provides a means of controlling access to storage resources 112 of storage device 110. Once initiator 106 has been assigned zone groups to storage, the initiator can proceed to generate and send to storage device 110 commands to store data to storage resources 112 and commands to retrieve data from the storage resources.

The initiator 108 has structure and functionality similar to those of initiator 106 as described herein. For example, initiator 108 includes a host controller 140 and phys 142. The phys 142 may associated with ports of input/output modules or expanders of initiator 108 and can include transmitters and receivers for communicating with other phys of ports of devices over data storage fabric 100. For example, phys 142 can be configured to communicate with phys 136 of switch 104 through communication link 150. Although two initiators 106, 108 are shown, it should be understood that the techniques of the present application can be implemented with a different number of initiators a configuration of initiators.

The switch 102 can include functionality to manage communication and facilitate data transfer with other devices over data storage fabric 100. For example, switch 102 can manage communication and facilitate data transfer between initiator 106 and storage device 110. As shown in FIG. 1, in one example, switch 102 includes a zone manager 124, an expander 126 and phys 128, 130. As explained above, switch 102 (phys 128 of expander 126 of switch 102) is connected to initiator 106 (phys 122 of initiator 106) through communication link 144. Furthermore, switch 102 (phys 130 of expander 126 of switch 102) is connected to storage device 110 (phys 118 of expander 116 of storage resource 110) through communication link 146. The expander 126 is coupled to phys 128, 130 and is configured to control the operation of the phys including facilitating communication between initiator 106 and storage device 110 or other devices over data storage fabric 100. The zone manager 124 includes functionality to manage zone groups of expander 126 over data storage fabric 100. In one example, zone manager 124 can receive zone group information and use the information to assign the zone group to initiator 106 and storage device 110 to control (allow or prevent) access to particular portions of storage resources 112 of the storage device. In one example, the zone groups can be configured as part of a zoned portion of a service delivery system (ZPSDS) of expanders of the switches as part of a SAS data storage fabric.

In a similar manner, switch 104 can include structure and functionality similar to those of switch 102. For example, switch 104 includes a zone manager 132, an expander 134 and phys 136, 138. The switch 104 (phys 138 of expander 134 of switch 104) is connected to storage device 110 (phys 118 of expander 116 of storage device 110) through communication link 148. Furthermore, switch 104 (phys 136 of expander 134 of switch 104) is connected to initiator 108 (phys 142 of initiator 108) through communication link 150. Although two switches 102, 104 are shown, it should be understood that the techniques of the present application can be implemented with a different number of switches and configuration of switches.

The storage device 110 can include functionality to manage and control access to storage resources 112 over data storage fabric 100. For example, storage device 110 is shown as having a storage manager 114, an expander 116 and phys 118. The expander 116 can be configured to control the operation of phys 118 including facilitation of communication with the phys to allow storage device 110 to be assigned zone groups which provide a means to define and control access to storage resources 112 over data storage fabric 100. The storage manager 114 can be configured to communicate with zone manager 124 of switch 102 through communication link 146. For example, storage manager 114 may allow zone manager 114 to send zone group information which the storage manager can use to assign a zone group to one of the phys 118 of expander 116 to allow expander 126 of switch 102 to access storage resources 112. The storage manager 114 can be configured to check the status of the phy 118 that is assigned a zone group. If storage manager 114 determines that the status indicates a disconnection condition with switch 102, then the storage manager can configure expander 116 to prevent access to storage resources 112. The storage manager 114 can then check for a reconnection condition. If storage manager 114 determines that the status of the phy 118 indicates a reconnection condition with a second switch (such as switch 104), then the storage manager can allow a zone manager of the second switch 104 to assign a zone group to the phy 118 to allow the second switch access to storage resources 112. In one example, storage manager can receive appropriate zone group information from the second switch 104 and program or configure the zone group of the storage resources accordingly. In this manner, the second switch 104 does not automatically obtain access to storage resources 112 of the storage device. Instead, storage device 110 provides access to storage resources 112 when it receives appropriate zone group information from the second switch.

The storage device 110 can include functionality to facilitate communication with initiator 104 (and initiator 106) over data storage fabric 100. For example, storage manager 114 can be part of expander 116 which can support communication functions with storage resource including zoning of storage resources for initiators. In one example, switch 102 provides a communication path between initiator 104 and storage device 110. The communication path may include communication links 144, 146 which can facilitate communication between initiator 106 and switch 102 over data storage fabric 100. In a similar manner, switch 104 provides a communication path between initiator 108 and storage device 110. The communication path may include communication links 150, 148 which can facilitate communication between initiator 108 and switch 104 over data storage fabric 100. The communication paths may employ SAS protocols and support SAS commands and messages with information and data about initiator 106. For example, initiator 106 can be assigned zone groups to access particular storage resources 112 such as portions of disk drives and the like. The switch 102 and storage manager 114 of storage device 110 can keep track of the zone group information to check whether initiator 106, or any other device, is authorized to access storage resources 112. The storage manager 114 can receive from initiator 106 commands through switch 102 to store data to the particular authorized portions of storage resources 112. The storage manager 114 can also receive from initiator 106 commands to retrieve data from storage resources which have been assigned to the initiator.

The data storage fabric 100 shows storage device 110 but it should be understood that the techniques of the present application can be employed with a different number and configuration of storage devices. The storage resources 112 can include any means of storing data for subsequent retrieval. In one example, storage device 110 may include a storage enclosure with storage drive bays to support storage resources 112 which may contain one more of a non-volatile memory, a volatile memory, and/or one or more storage devices such as storage drives, such as disk drives, solid state drives, optical drives, tape drives, and the like.

The data storage fabric 110 provides communication paths that include communication links 144, 146, 148, 150 which can comprise any means of providing communication between phys over the data storage fabric. As explained above, phys can be part of input/output modules of ports of expanders and can include transmitters and receivers for communicating with transmitters and receivers of phys of expanders of other devices such as switches. In a data storage fabric, phys represent physical communication structures which can be grouped as ports which represent logical communication structures. The communication links can include communication medium which can comprise any physical means of providing electrical or optical communication such as fiber optic cable, copper cable, a combination thereof and the like.

The configuration of the data storage fabric of FIG. 1 is for illustrative purposes and it should be understood that a different configuration can be employed to implement the techniques of the present application. For example, the functionality of storage manager 114 is shown as part of storage device 110, however, it should be understood that other configurations are possible. For example, the functionality of storage manager 114 can be distributed among a plurality of devices located locally, remotely or a combination thereof. The functionality of storage device 110 and its components, such as storage manager 114, can be implemented in hardware, software, or a combination thereof. The techniques of the present application are shown as part of data storage fabric such as SAS fabric architecture, however, it should be understood that the techniques of the present application can be applicable in other architectures such as Storage Area Networks (SAN), Direct Attached Networks (DAN) or other network architectures. The storage device 110 is shown having an expander 116 but it should be understood that the storage device can include a different number of and configuration of expanders.

A description will be provided of the operation of data storage fabric 100 according to one example of the techniques of the present application. In one example, switch 102 (and switch 104) can be configured to perform protocol level operations that include a communication link initialization process. The process may include configuration of storage fabric 100 such as switch 102 (and switch 104) to communicate with other devices coupled to the data storage fabric. The process can also include and obtaining information of the devices coupled to data storage fabric 100. For example, zone manager 124 of switch 102 can obtain information regarding initiator 106 and storage device 110 which are coupled to data storage fabric 100. This information can include characteristics of the devices such as the number and type of devices, address of the devices and the like. The zone manager 124 can use this information to communicate with the expanders and phys of these devices to determine which devices are coupled to data storage fabric 100. For example, zone manager 124 can communicate with phys 128 of switch 102 and phys 122 of initiator 106 through communication link 144 to determine that initiator 106 is coupled to the switch. In another example, zone manager 124 can communicate with phys 130 of switch 102 and phys 118 of storage device 110 through communication link 146 to determine that storage device 110 is coupled to the switch. As explained above, data storage fabric 100 may include devices that have expanders which may include phys as part of ports of expanders. The phys can provide physical communication means and may include transmitters and receivers to allow communication with other phys of other devices coupled to the data storage fabric. The phys represent physical communication elements and can be grouped or organized as ports which may represent logical communication elements. In some examples, one or more phys can be connected to the same device which means that they may have the same address on the source side and the destination side of the device.

The switch 102 (and switch 104) can be configured to perform a discovery process of data storage fabric 100. In one example, in a SAS environment, zone manager 124 of switch 102 can perform a discovery process that can include sending SAS discovery commands to devices connected to data storage fabric 100. The discovery process may be performed at the phy level and include determining which phys are connected to the devices of data storage fabric 100. In some examples, phys may be grouped to form ports and zone manager 124 can determines which phys are connected to the same device. In one example, a narrow port can comprise a single phy whereas a wide port can comprise a plurality of phys. The zone manager 124 can employ SAS discovery commands to determine which devices connected to each and every phy. For example, if zone manager 124 determines that a device contains an expander, then the zone manager can send further discovery commands beyond the expander and to subsequent expanders to determine whether there are devices connected beyond the expander. In this manner, zone manager 124 can discover or determine which devices form the topology of data storage fabric 100.

The zone manager 124 of switch 102 can maintain a record of the devices and associated zone groups that form the topology of data storage fabric 100. The zone manager 124 can include functionality to assign zone groups to devices of data storage fabric 100. In some examples, zone manager 124 can include an interface to allow users, such as system administrators of data storage fabric 100, to enter or specify zone group information. The interface can include an electronic device, such as a personal computer, with a user interface to allow a user to select and enter zone group information and otherwise configure data storage fabric 100. The zone group can provide a mechanism to control which devices may have permission or authorization to access devices of data storage fabric 100 such as storage resources 112 of storage device 110. For example, zone manager 124 can assign one zone group to initiator 106 and assign that same zone group to storage resources 112 whereas the zone manager can assign a different zone group to initiator 108. In this manner, for example, initiator 106 may have access to storage resource 112 while initiator 108 may not have access to the storage resources. The zone group information may also include permission information in the form of a permission table that lists devices and corresponding storage resources access permissions. The zone manager 124 can send this zone group information to the devices and the devices can then use this information to program their respective expanders to control respective access. For example, storage device 110 can receive zone group information and record this information to allow access to initiator 106 but prevent access to initiator 108. In one example, storage manager 114 can use this zone group information to program phys 118 of expander 116 and configure permission tables to control access to storage resources 112 by initiator 106. In this manner, initiator 106 can be provided with access to storage resources 112 whereas initiator 108 may be prevented from accessing the storage resources.

In other words, storage resources 112 may be visible to initiator 106 but not visible to initiator 108. The zone manager of a switch can program the expander of a storage device with appropriate zone group information from the permission table to provide the initiator with access to the specific storage resources. Once the topology of data storage fabric 100 has been configured (i.e., devices have been assigned zone groups), the initiator can access the permitted storage resources of the fabric.

Further to illustrate, it can be assumed that a disconnection condition occurs. For example, suppose that a cable is used to establish communication link 146 between switch 102 (first switch) and storage device 110 and then that the cable, or one end of the cable, is disconnected or removed between the switch and the storage device. That is a disconnection condition occurs between phys 130 of switch 102 and phys 118 of storage device 110 such that there is no longer communication between the switch and the storage device. Now suppose that a reconnection condition occurs such that the cable is reconnected between storage device 110 and switch 104 (second switch) thereby establishing communication link 148. That is, the communication link 148 establishes communication between phys 138 of switch 104 and phys 118 of storage device 110. It can be further assumed that storage device 110 is active (powered on) and has a zone group assigned to storage resources such that switch 104 (second switch) and initiator 108 are assigned the same zone group as switch 102 (first switch).

In some systems, communication link 148 established as a result of the reconnection condition may allow initiator 108 and switch 104 (second switch) with access to storage resources for some period of time. In other words, switch 104 (second switch) and initiator 108 may have been assigned the same zone group as the zone group assigned to the devices of the previous connection between switch 102 (first switch), initiator 106 and storage device 110. That is, storage device 110 has been assigned the same zone group for the first connection (initiator 106 and switch 102) as the second connection as a result of the reconnection condition (initiator 108 and switch 104). It may not be desirable for the second connection (initiator 108 and switch 104) to have access to these storage resources.

The techniques of the present application may help reduce the occurrence of devices from a reconnection condition (initiator 108 and switch 104) from automatically accessing storage resources. In one example, storage manager 114 can include functionality to check or monitor for a disconnection condition such as a cable disconnection between the storage device and switches. If storage manager 114 detects such a disconnection condition, the storage manager can disable the expander of the storage device which can prevent access to devices that are not authorized. For example, expander 116 can include zoning functionality that can allow storage manager 114 to disable the zoning functionality. The expander 116 may include a data bit that can be configured to have two modes of operation: disabled or enabled. The storage manager 114 can set the bit of the expander to the disabled state (inactive state) such that storage resources 112 cannot be accessed from devices through data storage fabric 100. In another example, storage manager 114 can set the zone group of the expander to a special zone group (0) that disables access to storage resources. In contrast, in some systems, a user or system administrator may have to power down the storage device when a disconnection condition occurs. This power down action may cause the zone groups of the storage device to be reset which may not be desirable. Instead, in some examples of the present application, storage manager can be configured to disable zoning on an expander upon a disconnection condition which may help prevent access to storage resources from unauthorized or improperly zoned devices. In the present application, the storage manager can then wait to receive zone group information from a new device upon a reconnection condition and thereby provide authorized or proper access to the devices of the new connection.

Figure 2:
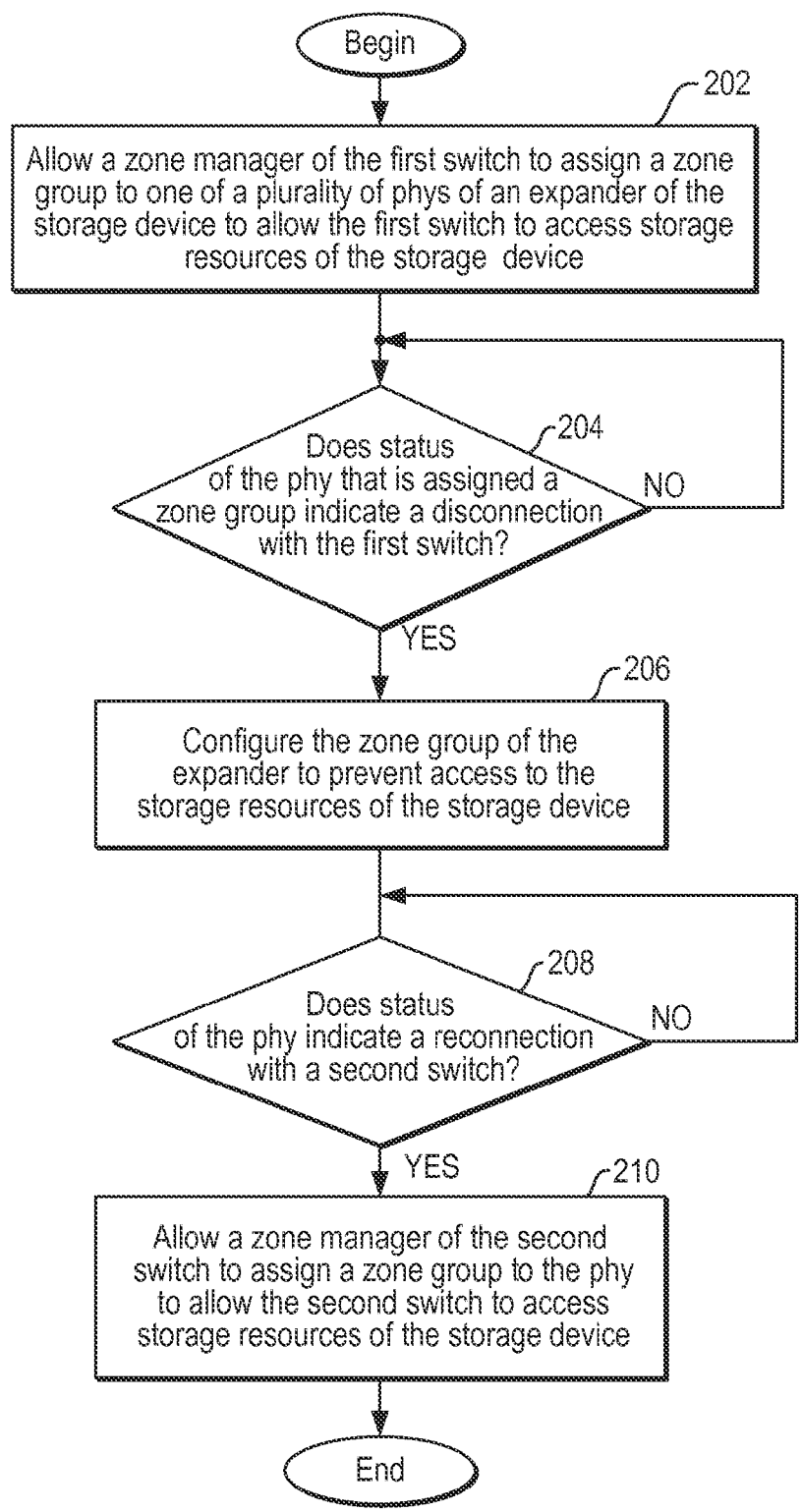
FIG. 2 is an example process flow diagram of a method for a storage device to provide access to storage resources over a fabric.

FIG. 2 is an example process flow diagram of a method for a storage device to provide access to storage resources over a fabric.

To illustrate, in one example, it will be assumed that switch 102 is connected to initiator 106 and to storage device 110 as part of data storage fabric 100 shown in FIG. 1. In one example, the connection can include a communication path that includes communication link 144 with a cable coupled between switch 102 (a phy 128 of expander 126 of switch 102) and initiator 106 (a phy 122 of initiator 106). The connection can also include a communication path that includes communication link 146 with a cable coupled between switch 102 (a phy 130 of expander 126 of switch 102) and storage device 110 (a phy 118 of expander of storage device 110). The communication paths can comprise a communication medium such as any physical means of providing electrical or optical communication such as fiber optic cable, copper cable, a combination thereof and the like. As explained below in detail, an example process is described of providing access to storage resources when a reconnection condition occurs after a disconnection condition occurs. For example, the process describes a first connection (initiator 106 and first switch 102) that is zoned or assigned to storage resources. Then the first connection encounters a disconnection condition and then the second connection (initiator 108 and second switch 104) is established as a result of the reconnection condition.

The method may begin at block 202, where storage device 110 allows zone manager 124 of switch 102 (first switch) to assign a zone group to one of a plurality of phys 118 of expander 116 of the storage device to allow the switch to access storage resources 112 of the storage device. In one example, storage manager 114 receives a command from switch 102 that includes zone group information to configure one of the phys 118 to allow the switch 102 to access storage resources 112 of the storage device. The storage manager 114 can use the received zone group information to configure expander 116 to allow access to the corresponding storage resources 112. In another example, storage device 110 may include a global zoning state which can be set to the enabled state (active state) to allow communication between switch 102 and storage device 110.

Once storage device 110 has been configured with the zone group information, a communication path is established between switch 102 and storage device 110 to allow access to the corresponding storage resources 112. In another example, to further illustrate, it can be assumed that initiator 106 is connected to switch 102 and that it has been assigned the same zone group as storage resource 110. This allows switch 102 to facilitate communication between initiator 106 and storage device 110. For example, storage manager 114 can receive from initiator 106 commands through switch 102 to store data to the particular authorized portions of storage resources 112. The storage manager 114 can also receive from initiator 106 commands to retrieve data from storage resources which have been assigned to the initiator. Once the communication path has been established, processing proceeds to block 204 to have storage manager 114 monitor status of communication between storage device 110 and switch 102.

At block 204, storage device 110 checks the status of a phy that is assigned a zone group with switch 102. In one example, storage manager 114 can check whether the status of a phy 118 of expander 116 that has been assigned a zone group with switch 102 indicates a disconnection condition with the switch. A disconnection condition can include a disconnection of a communication cable (or other communication medium) between storage device 110 (a phy 118 of expander 116 of storage device 110) and switch 102 (a phy 130 of expander 126 of switch 102). If storage manager 114 does not detect such a disconnection condition, then processing proceeds to back to block 204 where the storage manager can continue to monitor or check for a disconnection condition. The storage manager 114 can perform the process of monitoring or checking for a disconnection condition as a background process. That is, storage manager 114 can concurrently perform other functions such as processing commands from initiator 106 to read data from storage resources 112 and write data to the storage resources. On the other hand, if storage manager 114 detects such a disconnection occurrence, then processing proceeds to block 206 to have storage manager 114 proceed to perform a process to prevent access to storage resources 112.

At block 206, storage device 110 configures the zone group of expander 116 to prevent access to storage resources 112 of the storage device. For example, as explained above, expander 116 can include zoning functionality that can allow storage manager 114 to disable the zoning functionality. The expander 116 may include a bit that can be configured to have two modes of operation: disabled or enabled. The storage manager 114 can set the bit of the expander to the disabled state (inactive state) such that storage resources 112 cannot be accessed from devices through data storage fabric 100. In another example, storage manager 114 can set the zone group of the expander to a special zone group (with value of "0") that disables or prevents access to storage resources 112. Once storage device 110 has been configured to prevent access to storage resources 112, processing proceeds to block 208 to have storage manager 114 perform a process to monitor status of phys 118 of expander of the storage device.

At block 208, storage device 110 checks the status of a phy that is assigned a zone group to check whether it indicates a reconnection condition with another switch. In one example, storage manager 114 can check whether the status of a phy 118 of expander 116 indicates a reconnection condition with a switch. A reconnection condition can include a reconnection of a communication medium, such as a cable, between storage device 110 (a phy 118 of expander 116 of storage device 110) and another switch (a phy of an expander of another switch). If storage manager 114 does not detect such a reconnection condition, then processing proceeds to back to block 208 to have storage manager to continue to monitor or check for a reconnection condition event or occurrence. On the other hand, if storage manager 114 detects such a reconnection condition, then processing proceeds to block 210 to allow access to storage resources 112 of storage device 110. For example, to illustrate, it can be assumed that a reconnection condition occurs as a result of a user or system administrator reconnecting a cable, other communication medium, between storage device 110 (a phy 118 of expander 116 of storage device 110) and another switch such as switch 104 (a phy 138 of an expander 134 of a switch 104). In this case, processing proceeds to block 210 to allow storage device 110 to perform a process to allow access to storage resources At block 210, storage device 110 allows zone manager 132 of switch 104 (second switch) to assign a zone group to one of a plurality of phys 118 of expander 116 of the storage device to allow the second switch 104 to access storage resources 112 of the storage device. In one example, storage manager 114 can receive a command from switch 104 (second switch) that includes zone group information to configure one of the phys 118 to allow the switch 104 to access storage resources 112 of the storage device. The storage manager 114 can use the received zone group information to configure expander 116 to allow access to the corresponding storage resources 112. In another example, storage device 110 can include a global zoning state and storage manager 114 can set the global zoning state to the enabled state (active state) to allow communication between the new switch 104 (second switch) and storage device 110. Once storage device 110 has been configured with the zone group information, a communication link is established between switch 104 (second switch) and storage device 110 to allow access to the corresponding storage resources 112. In another example, to further illustrate, it can be assumed that initiator 108 is connected to switch 104 (second switch) and that it has been assigned the same zone group as storage resource 112. This allows switch 104 (second switch) to facilitate communication between initiator 106 and storage device 110. In this manner, the switch 104 (second switch) does not automatically obtain access to storage resources 112 of the storage device. Instead, storage device 110 provides the new switch with access to the appropriate portions of storage resources 112 when the storage device receives appropriate zone group information from the second switch.

The above example describes a technique that includes configuring storage manager 114 to check a disconnection condition with a first switch and then a reconnection condition with a second switch that is different from the first switch. However, it should be understood the techniques of the present application can be applied to other configurations. For example, storage manager 114 can be configured to check for a disconnection condition with a first switch and then a reconnection condition with the same or first switch. The storage manager 114 can keep track of address information about the first switch such as the address of the switch. In case there is disconnection condition with the first switch and then a reconnection condition with the first switch, storage manager 114 can then reestablish a connection with the first switch based in part on the address information of the switch.

The above described an example process for providing access to storage resources when a reconnection condition occurs after the occurrence of a disconnection condition. However, it should be understood that the example is for illustrative purposes and that other examples and configurations are possible. For example, the above showed a first connection (initiator 106 and switch 102) zoned or assigned to storage resources and then reconnection condition that included a second connection (initiator 108 and switch 104) zoned to the storage resources. However, it should be understood that the techniques of the present application can be applied to other configurations. For example, the above process can be applied to a reverse situation where a first connection (initiator 108 and switch 104) is zoned or assigned to storage resources and then reconnection condition occurs that includes a second connection (initiator 106 and switch 102) zoned to the storage resources.

The above techniques of the present application may provide advantages. For example, the data storage fabric may include a switch connected to a storage device that includes a storage enclosure with SAS-2 zoning functionality enabled. Suppose that a disconnection condition occurs between the storage device and a first switch and then reconnection condition occurs between the storage device and second switch. In some systems, storage device zoning would remain enabled which may allow the second switch with unauthorized access to the storage resources, which may present a security problem and may be undesirable. In some other systems, the storage device may either allow the second switch to automatically join the storage device expander to be part of the ZPSDS of the expander or prevent the storage device from joining the ZPSDS. If the system allows storage device to automatically join the ZPSDS, then this may present a potential security problem because initiators may temporarily gain access to storage resources which they were not assigned (because of previously configured zone settings) until a zone manager address the issue. If the system prevents the storage device from automatically joining the ZPSDS, then this may reduce the security problem but may require a user to assert physical presence (e.g., reset the storage device) or require a zone manager password so the zone manager can obtain access to the storage device to reconfigure zoning. In contrast, the techniques of the present application may allow a storage device to be reconnected from one switch to another switch while reducing the possibility of a security problem and reducing requiring physical presence/password assertion by a user or system administrator. As explained above, in one example, the present techniques may include a storage device with a storage manager that can detect a disconnection condition with a switch and then automatically disable zoning on the expander of the storage device which may prevent access to storage resources of the storage device. The storage manager can then check when the storage device is reconnected to a new switch and then allow the new switch to configure zoning on the storage device to thereby allow access to the storage resources. In other words, a user can easily cable storage devices from one switch to another switch and the storage device may operate as expected while reducing the need for additional special steps and can improve the security of the system than what it would be otherwise.

Figure 3:
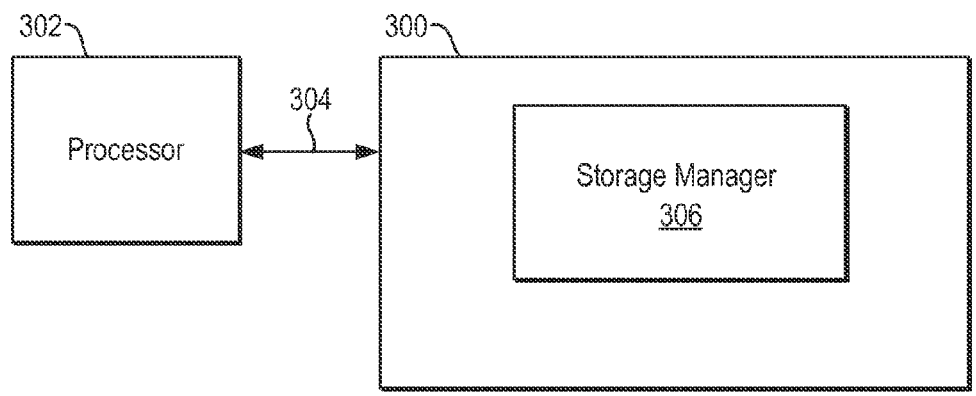
FIG. 3 is an example block diagram showing a non-transitory, computer-readable medium that stores instructions for storage device to provide access to storage resources over a fabric.

FIG. 3 is an example block diagram showing a non-transitory, computer-readable medium that stores code for operating a storage device to provide access to storage resources over a fabric. The non-transitory, computer-readable medium is generally referred to by the reference number 300 and may be included in storage device of the fabric described in relation to FIG. 1. The non-transitory, computer-readable medium 300 may correspond to any typical storage device that stores computer-implemented instructions, such as programming code or the like. For example, the non-transitory, computer-readable medium 300 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, solid state drives and flash memory devices.

A processor 302 generally retrieves and executes the instructions stored in the non-transitory, computer-readable medium 300 to operate the storage device in accordance with an example. In an example, the tangible, machine-readable medium 300 can be accessed by the processor 302 over a bus 304. A first region 306 of the non-transitory, computer-readable medium 300 may include functionality to implement storage manager as described herein.

Although shown as contiguous blocks, the software components can be stored in any order or configuration. For example, if the non-transitory, computer-readable medium 300 is a hard drive, the software components can be stored in non-contiguous, or even overlapping, sectors.

What is claimed is:

1. A storage device to provide access to storage resources over a data storage fabric comprising:
   an expander having phys (physical layers) to be assigned zone groups to enable access to storage resources of the storage device over a data storage fabric; and
   a storage manager to:
   enable a zone manager of a first switch to assign a zone group to one of the phys of the expander of the storage device to enable the first switch to access storage resources of the storage device,
   determine when status of the phy that is assigned a zone group indicates a disconnection condition with the first switch, then configure the zone group of the expander of the storage device to prevent access to the storage resources of the storage device, and
   determine when after the disconnection condition, the status of the phy indicates a reconnection condition with a second switch, then enable a zone manager of the second switch to assign a zone group to the phy to enable the second switch to access storage resources of the storage device.

2. The storage device of claim 1, wherein the zone group is configured as part of a zoned portion of a service delivery system (ZPSDS) of expanders of the switches.

3. The storage device of claim 1, wherein the storage resources are configured to be accessed by initiators through switches over the data storage fabric.

4. The storage device of claim 1, wherein the phys include transmitters and receivers for communicating with transmitters and receivers of phys of expanders on the switches.

5. The storage device of claim 1, wherein the disconnection condition with the first switch includes a disconnection of a communication link with a communication medium uncoupled between the phy of the expander of the storage device and a phy of an expander of the first switch.

6. The storage device of claim 1, wherein the reconnection condition with a second switch includes a reconnection of a communication link with a communication medium coupled between the phy of the expander of the storage device and a phy of an expander of the second switch.

7. The storage device of claim 1, wherein the data storage fabric is a serial attached SCSI (SAS) system and the storage manager is configured to communicate with SAS switches and SAS initiators.

8. A method to provide access to storage resources of a storage device over a data storage fabric, comprising:
enable a zone manager of a first switch to assign a zone group to one of a plurality of phys (physical layers) of an expander of the storage device to enable the first switch to access storage resources of the storage device;
configure the zone group of the expander of the storage device to prevent access to the storage resources of the storage device when status of the phy that is assigned a zone group indicates a disconnection condition with the first switch; and
enable a zone manager of the second switch to assign a zone group to the phy to enable the second switch to access storage resources of the storage device when after the disconnection condition, the status of the phy indicates a reconnection condition with a second switch.

9. The method of claim 8, wherein the zone group is configured as part of a zoned portion of a service delivery system (ZPSDS) of expanders of the switches.

10. The method of claim 8, wherein the storage resources to be accessed by initiators through the switches of the data storage fabric.

11. The method of claim 8, wherein the phys include transmitters and receivers for communicating with transmitters and receivers of phys of expanders on the switches.

12. The method of claim 8, wherein the disconnection condition includes a disconnection of a communication link with a communication medium uncoupled between the phy of the expander of the storage device and a phy of an expander of the first switch.

13. The method of claim 8, wherein the reconnection condition includes a reconnection of a communication link with a communication medium coupled between the phy of the expander of the storage device and a phy of an expander of the second switch.

14. The method of claim 8, wherein the data storage fabric is a serial attached SCSI (SAS) system and the storage manager is configured to communicate with SAS switches and SAS initiators.

15. A non-transitory computer-readable medium having computer executable instructions stored thereon to provide access to storage resources of a storage device over a data storage fabric, the instructions are executable by a processor to:
enable a zone manager of a first switch to assign a zone group to one of a plurality of phys (physical layers) of an expander of the storage device to enable the first switch to access storage resources of the storage device;
configure the zone group of the expander of the storage device to prevent access to the storage resources of the storage device in response to status of the phy that is assigned a zone group indicates a disconnection condition with the first switch; and
enable a zone manager of the second switch to assign a zone group to the phy to enable the second switch to access storage resources of the storage device in response to after the disconnection condition, the status of the phy indicates a reconnection condition with a second switch.

16. The non-transitory computer readable medium of claim 15, wherein the zone group is configured as part of a zoned portion of a service delivery system (ZPSDS) of expanders of the switches.

17. The non-transitory computer readable medium of claim 15, further comprising instructions to cause the processor to provide access to storage resources by initiators through the switches of the data storage fabric.

18. The non-transitory computer readable medium of claim 15, wherein the disconnection condition includes a disconnection of a communication link with a communication medium uncoupled between the phy of the expander of the storage device and a phy of an expander of the first switch.

19. The non-transitory computer readable medium of claim 15, wherein the reconnection condition includes a reconnection of a communication link with a communication medium coupled between the phy of the expander of the storage device and a phy of an expander of the second switch.

20. The non-transitory computer readable medium of claim 15, further comprising instructions to configure the storage manager to operate according to a serial attached SCSI (SAS) protocol.

* * * * *